United States Patent [19]

Eilenstein-Wiegmanns et al.

[11] Patent Number: 5,090,638
[45] Date of Patent: Feb. 25, 1992

[54] LOCKING MECHANISM FOR TYING DOWN FREIGHT IN AN AIRCRAFT

[75] Inventors: Wilfried Eilenstein-Wiegmanns, Stuhr; Hartmut Sempert, Delmenhorst, both of Fed. Rep. of Germany

[73] Assignee: Deutsche Airbus GmbH, Hamburg, Fed. Rep. of Germany

[21] Appl. No.: 722,896

[22] Filed: Jun. 28, 1991

[30] Foreign Application Priority Data

Jul. 5, 1990 [DE] Fed. Rep. of Germany ....... 4021499

[51] Int. Cl.⁵ .............................................. B64C 1/20
[52] U.S. Cl. .................................. 244/118.1; 410/69
[58] Field of Search ............... 244/118.1, 137.3, 137.4; 410/69, 90, 107, 109, 111

[56] References Cited

U.S. PATENT DOCUMENTS 4,372,715 2/1983 Naffa ..................................... 410/69
4,583,896 4/1986 Vogg et al. ............................ 410/69

FOREIGN PATENT DOCUMENTS 2089884 12/1980 Fed. Rep. of Germany ... 244/137.3
3222202 4/1984 Fed. Rep. of Germany .

Primary Examiner—Joseph F. Peters, Jr.
Assistant Examiner—Virna L. Mojica
Attorney, Agent, or Firm—W. G. Fasse

[57] ABSTRACT

A locking mechanism for tying down a piece of freight on a loading floor in an aircraft has a housing (11) recessed in the loading floor. A latch operating member (1) and a latching member (10) are journalled in the housing to tilt toward each other or away from each other. Follower cams (16) of the latching member (10) ride in respective cam guide tracks (15) of the latch operating member (1). A tension spring (20) tends to bias the latching member (10) and the latch operating member (1) in opposite directions in a freight latching position or into a recessed beyond dead center position. Stop members (17, 18) are so positioned on the latch operating member and on the latching member that the latter cannot be tilted without activating the latch operating member which can be rolled over by a piece of freight in one direction when projecting from the housing and in the other direction when recessed into the housing.

7 Claims, 3 Drawing Sheets

LOCKING MECHANISM FOR TYING DOWN FREIGHT IN AN AIRCRAFT

FIELD OF THE INVENTION

The invention relates to a locking mechanism for tying down a piece of freight or cargo on the loading floor of an aircraft.

BACKGROUND INFORMATION

Such locking mechanisms include a housing mounted in a recess in the freight loading floor and the components of the locking mechanism are recessible into the housing below a level defined by the top surface of the loading floor when the locking mechanism is not in use. In a tie down position the components of the locking mechanism project above the floor level. A latching member and a latch operating member are journalled in the housing and biased by a tension spring connected to the latching member and the latch operating member eccentrically relative to the journals of these members.

Locking mechanisms of the type described above are supposed to tie down a piece of freight, such as a container and/or a pallet on the loading floor to maintain the freight piece in a safe position during all operational conditions of the aircraft. German Patent Publication (DE) 3,222,202 discloses a mechanism as described above, wherein the locking mechanism is equipped with so-called snap or rapid closure elements. Such locking devices can be used and locked in position in any desirable location within the loading floor of an aircraft and the size of the rapid snap closure elements will depend on the size of the freight pieces to be tied down. These locking devices can be rolled over by a piece of freight in at least one direction, even if a component of the locking mechanism projects above the loading floor level. This ability to be rolled over automatically by a piece of freight is an advantage, because it facilitates the loading operation within the freight space of the aircraft. Rolling over in an opposite direction usually requires recessing and arresting the locking mechanism below the freight floor level. In spite of the just mentioned advantage of conventional locking mechanisms, there is room for improvement, especially with regard to making such locking mechanisms more compact, particularly reducing their structural length so as to be able to make the openings in the loading floor smaller, thereby saving valuable loading space. There is also room for improvement to make these locking mechanisms less complicated in their structure.

OBJECTS OF THE INVENTION

In view of the foregoing it is the aim of the invention to achieve the following objects singly or in combination:

to construct a locking mechanism of the type described above in such a manner that its structural length is substantially reduced and so that its cooperating elements are few in number and simple in their structure and cooperation;

to optimally reduce the floor space required for these locking mechanisms, thereby increasing the available loading space for payloads;

to arrange a tension spring in such a way that it biases the latching member and thus also the latch operating member into a recessed beyond dead center position, thereby assuring that the locking mechanism cannot accidentally pop out of the loading floor; and to make sure that the latching member cannot be operated without activating the latch operating member.

SUMMARY OF THE INVENTION

The locking mechanism according to the invention is characterized in that the latching member engages with two laterally projecting follower cams respective guide cam tracks in a latch operating member and that the cam guide tracks have two legs which enclose an acute angle with each other. In the freight locking position the two cam track legs slant approximately downwardly so that the vertex of the acute angle enclosed by the cam track legs points upwardly.

The locking mechanism according to the invention has the advantage of a very short structural length so that it uses up very little of the available loading space. Another advantage of the invention is seen in that the tensioning spring which biases the latching member and the latch operating member relative to each other can be arranged in such a way that the latching member and thus also the latch operating member in the recessed position, assume a beyond dead center position so that they cannot accidentally pop out of the loading floor once the mechanism has been pushed into its recessed position within the loading floor to a sufficient extent.

The invention also makes sure that the latching member cannot move without activating the latch operating member. For this purpose the latching member and the latch operating member are each equipped with a stop element in such a position relative to each other that only an intentional activation of the latch operating member will move the latching member.

BRIEF DESCRIPTION OF THE DRAWINGS

In order that the invention may be clearly understood it will now be described, by way of example, with reference to the accompanying drawings, wherein.

Figure 1:
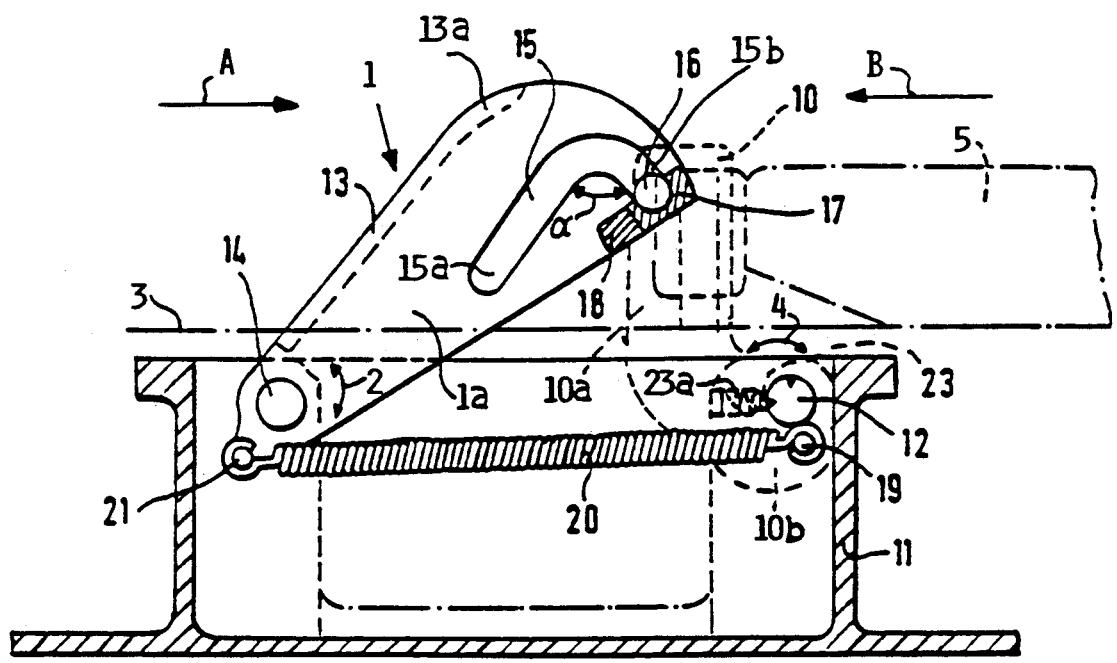
FIG. 1 is a side view, partially in section, of the present locking mechanism with its latching member and with its latch operating member in a freight tying down position.

DETAILED DESCRIPTION OF PREFERRED EXAMPLE EMBODIMENTS AND OF THE BEST MODE OF THE INVENTION

Referring to FIGS. 1 to 5, a latch operating member 1 is journalled on a first journal pin 14 for a tilting back and forth movement as indicated by the arrow 2. The first journal pin 14 is mounted in a housing 11 which may form part of the loading floor of the cargo space of an aircraft. The loading floor level is indicated at 3. A latching member 10 is journalled on a second journal pin 12 also mounted in the housing 11. The latching member 10 is tiltable back and forth as indicated by the arrow 4 in response to the actuation of the operating member 1. The journal pins 12 and 14 may be secured rigidly to the housing 11 and the latching member 10 and the latch operating member 1 may be movable relative to the fixed journal pins. Alternately, the journal pins may be rotatably mounted in wall portions of the housing 11 and rigidly secured to the members 10 and 1.

Figure 2:
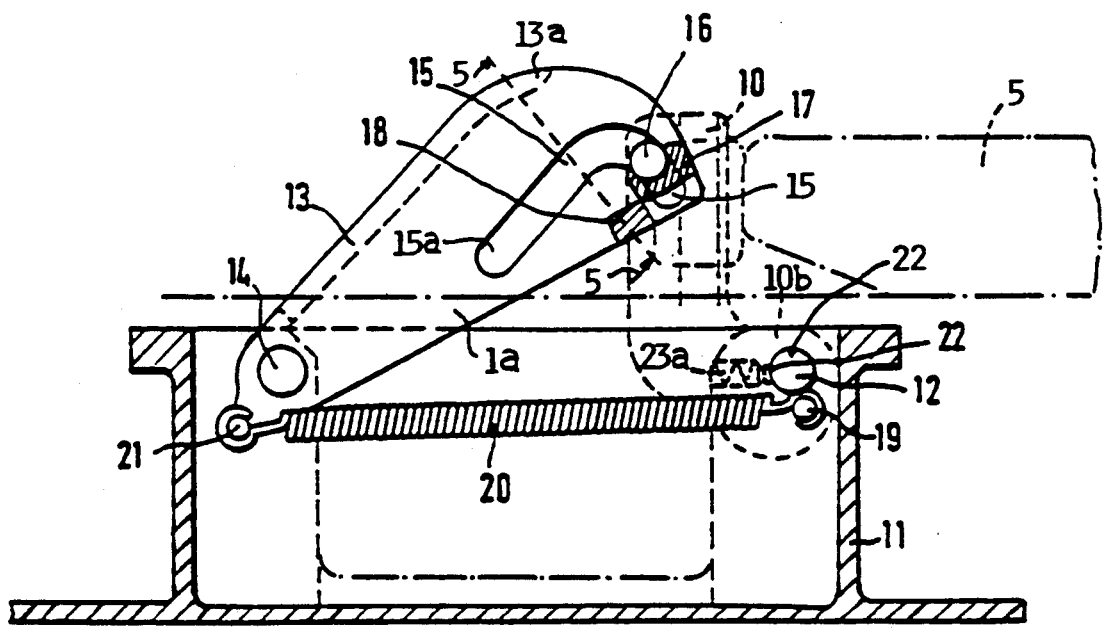
FIG. 2 is a view similar to that of FIG. 1, but showing the relative position of the latch member to the latch operating member, whereby the latter has been pushed slightly downwardly to permit a release operation of the latching member.

The latching member 10 has a leg 10a that extends approximately upwardly in the positions shown in FIGS. 1 and 2 and a leg 10b that is operatively connected to the second journal pin 12. The two legs 10a and 10b of the latching member 10 form approximately an L-configuration, whereby the second journal pin 12 passes through an end of the shorter leg 10b to permit the tilting motion indicated by the double arrow 4. The latching member 10 latches onto a piece of cargo 5 in a conventional manner.

Figure 5:
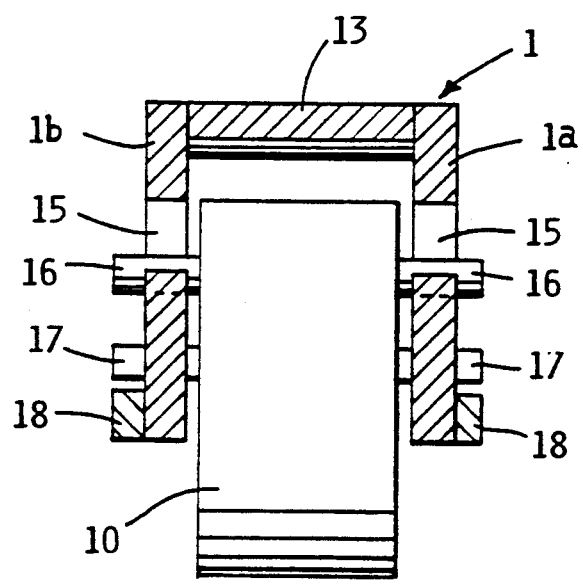
FIG. 5 is a sectional view along section line 5—5 in FIG. 2.

The latching member 10 is operated by the latch operating member 1 due to the cooperation of two follower cams 16 extending laterally out of both sides of the latching member 10 and in axial alignment with each other, with guide cam tracks 15 in lateral or side walls 1a and 1b of the latch operating member 1. The side walls 1a and 1b of the latch operating member 1 are interconnected with a cross wall 13, thereby forming an inverted U-cross-section as best seen in FIG. 5. The cross wall 13 forms a ramp and simultaneously a handle 13a so that a piece of cargo 5 can move in the direction of the arrow A shown in FIG. 1 to roll over the locking mechanism. When a cargo piece 5 is moved in the direction of the arrow B in FIG. 1, it is necessary that the latching member 10 which has an L-configuration and the latch operating member 1 are first pressed downwardly. The L-configuration of the latching member 10 fits into the space between the side walls 1a, 1b of the latch operating member 1 and the two follower cams 16 engage the respective guide cam tracks 15 simultaneously, see FIG. 5.

As shown in FIG. 5, the lateral walls 1a and 1b point downwardly into the housing 11 not shown in FIG. 5. The side walls 1a and 1b of the latch operating member 1 are not interconnected by the cross wall 13 near the latching member 10 so that the front end 13a of the cross wall 13 forms a handle while the outwardly facing surface of the cross wall 13 forms the above mentioned ramp.

Each of the two cam tracks 15 has, according to the invention, two legs 15a and 15b which enclose an acute angle ($\alpha$) with each other as shown in FIGS. 1 to 4. In the positions of the operating member 1 shown in FIGS. 1 and 2, the legs 15a and 15b slant approximately downwardly at such a slant that the vertex of the enclosed angle ($\alpha$) points substantially upwardly. Further, as best seen in FIG. 5, the latching member 10 carries on each side a stop element 17 and the operating member 1 carries on each of its side walls 1a, 1b a stop element 18. The stop elements 17 and 18 are so positioned relative to each other that in the freight latching position shown in FIG. 1, the latching member 10 cannot move and cannot be moved without first moving the latch operating member 1. In FIG. 2, the stop element 18 has almost cleared the stop element 17 by depressing the operating member 1 slightly downwardly. Once the stop element 18 has cleared the stop element 17, the upper curved portion of the cam guide tracks 15 will come into engagement with the follower cams 16, thereby causing the latching member 10 to move into the position shown in FIG. 3 and to further move into the position of FIG. 4 in response to further depression of the operating member 1. By preventing the operation of the latching member 10 without first activating the operating member 1, it is assured that an accidental release is avoided.

Figure 3:
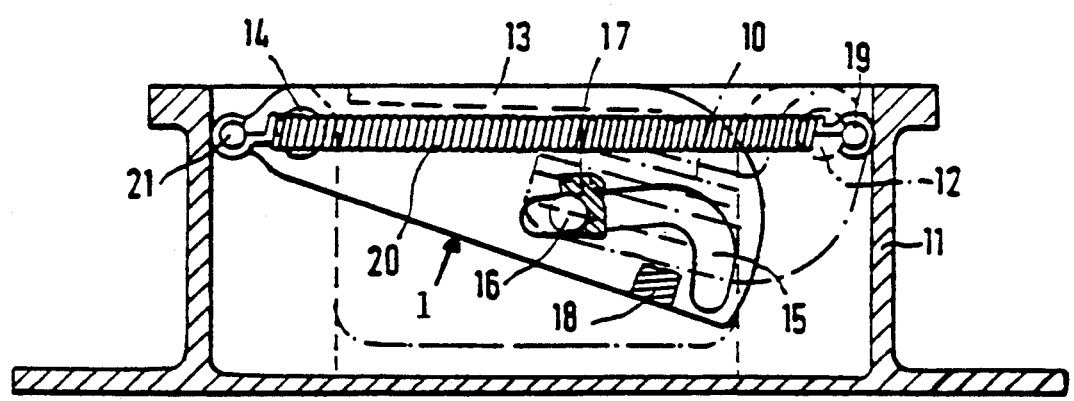
FIG. 3 is a view similar to that of FIGS. 1 and 2, but showing the locking mechanism in a recessed position corresponding to a dead center position.
Figure 4:
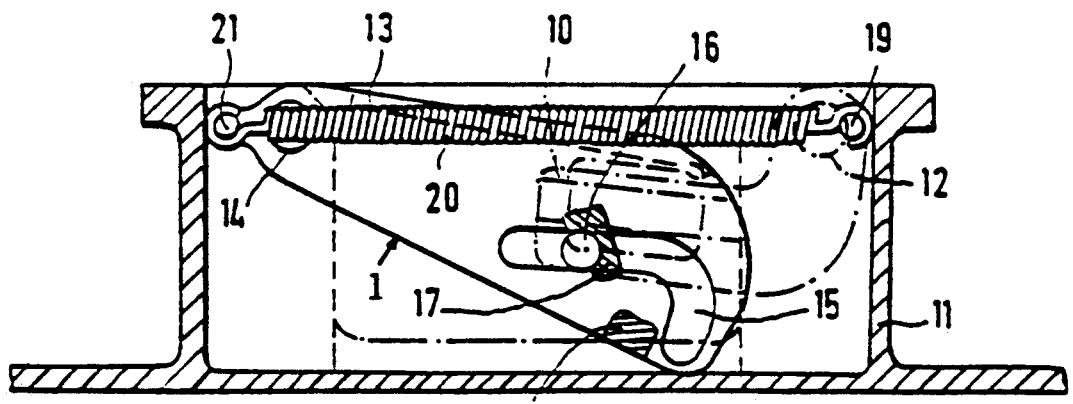
FIG. 4 is a view similar to that of FIGS. 1, 2, and 3, but showing the components of the locking mechanism in a recessed beyond dead center position making sure that the components cannot accidentally pop up out of their recessed position.

As shown in FIGS. 1, 2, 3, and 4, a tension spring 20 is connected at its left-hand end to a lug 21 secured to an extension of the side walls 1a, 1b of the operating member 1. The other end of the tension spring 20 is connected to a lug 19 secured to the short leg 10b of the latch member 10. Normally, the tension spring 20 biases the operating member 1 and the latching member 10 away from each other so that the operating member 1 is urged to turn counterclockwise while the latching member 10 is urged to turn clockwise. The lugs 19 and 21 are so positioned that the operating member 1 and the latching member 10 will assume a dead center position relative to each other as shown in FIG. 3 and will further assume a beyond dead center position as shown in FIG. 4 in response to further tilting the operating member 13 downwardly into the housing 11.

As mentioned above, the present locking mechanism can be rolled over by a piece of freight 5 if the latter moves in the direction A shown in FIG. 1, whereby the latching member 10 will return into the latching upright position in response to the tension of the spring 20. This is so because a rolling over tilts the operating member 1 only into the dead center position shown in FIG. 3. If the locking mechanism is to be rolled over in the opposite direction B, then the operating member 13 must be depressed all the way to the beyond dead center position of FIG. 4. In this position it is prevented to return into the upright position unless the operator lifts the member 13 by gripping behind the handle portion 13a.

Referring to FIGS. 1 and 2, the journal pin 12 is preferably equipped with two notches 22 in its surface for cooperation with a stop element 23 such as a ball biased by a spring 23a mounted in the housing 11. The notches or recesses 22 are so circumferentially spaced and positioned in the surface of the journal pin 12 that a spring bias arresting of the latching member 10 is assured in the upright freight latching position and in the beyond dead center position.

Although the invention has been described with reference to specific example embodiments it will be appreciated that it is intended to cover all modifications and equivalents within the scope of the appended claims.

What we claim is:

1. A locking mechanism for tying down a piece of freight on a loading floor in an aircraft, comprising housing means in said loading floor for housing said locking mechanism in a recessed position, a latch operating member (1), a first journal pin (14) for journalling said latch operating member (1) in said housing means, a latching member (10) for tying down said piece of freight, a second journal pin (12) for journalling said latching member (10) in said housing means, a tension spring (20) connected at one end to said latch operating member (1) and at its other end to said latching member (10) to bias said latch operating member (1) and said latching member (10) away from each other, said latch operating member (1) having two cam guide tracks (15), said latching member (10) having two follower cams each extending laterally into a respective cam guide track of said two cam guide tracks, each of said two cam guide tracks having two track sections merging into each other and enclosing an acute angle (α) with each other, said acute angle forming a vertex pointing substantially upwardly when said locking mechanism is in a freight tying down position.

2. The locking mechanism of claim 1, wherein said latch operating member (1) has two first side walls in each of which one of said two cam tracks is located and an end section to which said one end of said tension spring (20) is connected, wherein said latching member (10) has a first leg (10a) carrying said two follower cams (16) and a second leg (10b) to which said other end of said tension spring is connected, said tension spring biasing said latching member (10) in such a manner that said latching member (10) bands to assume a positively recessed beyond dead center position when said latching member (10) is in a recessed position inside said housing means (11).

3. The locking mechanism of claim 1, wherein said latching member (10) comprises first stop means (17) and wherein said latch operating member (1) comprises second stop means (18), said first and second stop means being positioned so that in an upward tying down position of said latching member (10) and of said latch operating member (1) said first stop means (17) rest against said second stop means (18), whereby tilting of said latching member (10) is prevented without a prior operation of said latch operating member (1).

4. The locking mechanism of claim 1, further comprising arresting means for positively holding said latching member (10) in any one of two positions including an upward freight tying down position and a recessed beyond dead center position in said housing means (11).

5. The locking mechanism of claim 4, wherein said arresting means comprise two circumferentially spaced recesses (22) in the surface of said second journal pin (12), an arresting member (23) operatively held in said housing means, and a compression biasing spring (23a) mounted in said housing means for biasing said arresting member (23) into any one of said two recesses for arresting said latching member in any one of said two positions.

6. The locking mechanism of claim 1, wherein said latch operating member (1) has a U-cross-section with two side walls and a cross wall interconnecting said side walls, one of said two cam guide tracks being arranged in each of said two side walls, said cross wall forming a ramp and a handle, and wherein said latching member has an L-configuration fitting between said side walls, said two follower cams extending in axial alignment with each other out of opposite sides of said L-configuration into said cam guide tracks.

7. The locking mechanism of claim 1, wherein said one end and said other end of said tension spring are secured to said latch operating member and to said latching member off-center relative to said first and second journal pins (14, 12).

* * * * *